(12) United States Patent
Crane et al.

(10) Patent No.: US 6,450,045 B1
(45) Date of Patent: Sep. 17, 2002

(54) TORQUE SENSING CALIBRATION UNIT

(75) Inventors: David Ogilvie Crane, Lutterworth; Hedley Lloyd Quinton, Derby, both of (GB)

(73) Assignee: Crane Electronics Ltd., Leicestershire (GB)

( * ) Notice: Subject to any disclaimer, the term of this patent is extended or adjusted under 35 U.S.C. 154(b) by 0 days.

(21) Appl. No.: 09/254,893
(22) PCT Filed: Sep. 12, 1997
(86) PCT No.: PCT/GB97/02506
  § 371 (c)(1),
  (2), (4) Date: Mar. 12, 1999
(87) PCT Pub. No.: WO98/11413
  PCT Pub. Date: Mar. 19, 1998

(30) Foreign Application Priority Data

Sep. 14, 1996 (GB) ............................................. 9619250

(51) Int. Cl.[7] ................................................. G01L 3/02
(52) U.S. Cl. ................. 73/862.322; 73/862; 73/862.08; 73/862.334
(58) Field of Search ................. 324/207.25; 73/862.332, 73/862.333, 862.334, 862.335, 862.336, 862.322, 862.08

(56) References Cited

U.S. PATENT DOCUMENTS

| 3,844,583 | A | * | 10/1974 | Sakow et al. | |
| 4,976,133 | A | | 12/1990 | Pohl | 73/1 C |
| 5,508,609 | A | * | 4/1996 | Parkinson et al. | 324/207.25 |
| 5,907,105 | A | * | 5/1999 | Pinkerton et al. | 73/862.336 |

FOREIGN PATENT DOCUMENTS

JP          63070137          3/1988

OTHER PUBLICATIONS

"New Instrumentation for Threaded Assembly Work," *Soviet Eng. Research* 11 (1991) No. 10 (pp. 104–108).

* cited by examiner

*Primary Examiner*—Benjamin R. Fuller
*Assistant Examiner*—Andre Allen
(74) *Attorney, Agent, or Firm*—Marshall, Gerstein & Borun

(57) ABSTRACT

A torque sensing calibration unit comprises a hollow torsion bar (2) to which torque is to be applied, associated with two or more pairs or positions sensors (10, 11, 12, 13, 14, 15) each pair being arranged to measure movement of the bar on diametrically opposite sides of a central axis through the bar (2). The pairs of sensors are arranged to measure movement in mutually perpendicular directions.

20 Claims, 3 Drawing Sheets

TORQUE SENSING CALIBRATION UNIT

FIELD OF THE INVENTION

The invention relates to a torque sensing calibration unit for calibrating or confirming the accuracy of calibration of torque sensing equipment such as a calibrated torque wrench or a torque sensor.

All measuring equipment if certified to operate to a particular degree of accuracy must be true to that standard of accuracy both immediately after manufacture and initial sale and after prolonged use. It is therefore necessary for all measuring or sensing equipment which carries such a certificate of accuracy to be regularly checked to confirm that the accuracy is maintained. Alternatively the equipment must be regularly recalibrated to the stated degree of accuracy. In the case of torque sensing equipment, such as torque indicating torque wrenches, frequent recalibrations are desirable. A typical calibration standard for a torque wrench would be a long arm beam designed to resist applied torque by means of a reaction torque generated by a proof mass suspended in a scale pan a significant distance, probably more than 2 meters, from a fulcrum of the beam. Torque is applied to the beam about an axis that coincides with the pivotal axis of the beam, and beam movement is prevented by the careful addition of proof masses to the scale pan at one end of the long arm beam until a balancing reaction torque is obtained. The entire calibration must be carried out in a temperature-controlled room, in conditions of controlled humidity, the room having a stable floor that is substantially free of vibration. The recalibration process is slow, as it involves the addition of proof masses individually to the scale pan. The recalibration can only be carried out at a certified testing site where the massive calibration equipment is permanently installed and where the force of gravity, g, is accurately known. The reaction torque τ applied by the long arm beam can however be derived directly as the product $$\tau = d \times M \times g$$

where d is the distance from the fulcrum of the beam to the scale pan,

M is the total proof mass added to the scale pan to prevent angular movement of the beam in response to an applied torque, and g is the acceleration due to gravity at the test site.

That measured reaction torque can be compared with the corresponding value as indicated by the torque sensor on the torque wrench, as a direct check on the accuracy of calibration of the sensor.

New proposals for desirable standards of calibration equipment and calibration procedures have suggested that any single calibration or recalibration of a torque measuring instrument should check the accuracy of the instrument's calibration in a series of measurements spanning a torque range of from 10% of the maximum rated torque of the instrument being calibrated to about 100%, in 10% increments. Furthermore, it has been suggested that each individual measurement should be repeated a number of times, with an average or a statistically weighted average being used to indicate the reaction torque being applied by the calibration equipment. It is impractical to use existing long arm beam calibration equipment in such repetitive calibration procedures, and there has emerged a need for an automatic machine capable of making a series of torque measurements as a predetermined automatically run cycle, each measurement being made to a certified degree of accuracy. Furthermore that accuracy needs to be at least as good as that of existing long arm beam calibration equipment. Preferably such automatic equipment should be able to permit automatic repeat measurements so that each torque measurement is taken a number of times to check and confirm its accuracy, and should be capable of automatically scanning across a defined range of torque loads, in a series of defined increments. Other desiderata attaching to the design of any such calibration equipment are that it should preferably be portable, should not require a knowledge of the acceleration due to gravity, g, at the test site, and that it should be capable of recognizing and allowing for the existence of side loads.

The invention is based on the realization that a secondary measuring instrument may be acceptable as a definitive reference for torque calibration if the accuracy of that secondary instrument is significantly greater than that of the primary torque reference measurement calibration apparatus.

BRIEF SUMMARY OF THE INVENTION

The invention provides a torque sensing calibration unit comprising a hollow torsion bar to which torque is to be applied, associated with at least two pairs of position sensors, each pair being arranged to measure movement of the bar on diametrically opposite sides of a central axis through the bar, and the pairs of sensors being arranged to measure movement in mutually perpendicular directions.

Preferably the hollow torsion bar has a disc-shaped terminal end and a first one of the two or more pairs of sensors is arranged to detect rotary movement about the central axis of the torsion bar. That can be achieved by using the first pair of position sensors to monitor the positions of a pair of flat coplanar faces of side lugs of the disc-shaped terminal end, the plane of the flat faces of the side lugs being coincident with the central axis of the torsion bar. The lugs are preferably equidistant from the central axis, so that pure rotations of the hollow torsion bar would move the lugs in equal and opposite directions. A side load applied to the torsion bar in a direction perpendicular to the plane of the flat faces would however cause deflection of the hollow torsion bar so as to move the lugs in the same direction, so that an analysis of the lug movements relative to one another gives accurate and independent identifications of both rotary movement and linear transverse movement of the torsion bar in the direction of measurement due to side loads.

A second pair of the position sensors is preferably arranged to detect rotary movement about an axis transverse to the central axis of the torsion bar, by monitoring the positions of a pair of target zones on the face of the disc-shaped terminal end of the torsion bar or on the side lugs, on diametrically opposite sides of the central axis. Analysis of the sensor outputs of the second pair gives an accurate identification of linear movement of the torsion bar due to side loads in a direction perpendicular to the side loads producing the transverse movement measured by the first pair of position sensors.

The third pair of the position sensors is arranged similarly to the second pair, but in a mutually perpendicular plane.

As an alternative to the second and third pairs of position sensors described above, a second pair of the position sensors may be arranged to monitor the positions of a pair of flat coplanar faces of a second pair of side lugs of the disc-shaped terminal end, the plane of the flat faces of the second pair of side lugs being coincident with the central axis of the torsion bar and perpendicular to that of the flat faces of the first pair of side lugs. In such an arrangement the analysis of the movement of the second pair of lugs relative to one another gives an accurate measure of rotary torsion induced movement and of linear side load induced movement of the torsion bar, independently of one another. Together, the first and second pairs of sensors therefore measure, independently, movement due to torque and movement due to side loads in two mutually perpendicular directions. A third pair of sensors could if appropriate monitor movement due to side loads along the third axis.

For ease of processing the data from the two or more pairs of sensors, all preferably monitor movement of areas of the terminal end of the torsion bar at equal distances from the central axis. Preferably the second and third pairs are arranged in a horizontal plane and in a vertical plane respectively through the central axis.

Because the analysis of data from the position sensors includes data identifying torque (rotational) loads and data identifying side loads in each of two or three three mutually perpendicular axes, it is possible when processing data from the calibration unit according to the invention to present results which represent pure torque as applied to the central axis of the torsion bar, as well as independently measured side load data.

Preferably the hollow torsion bar and terminal disc portion are machined from a single piece of high quality stainless steel, with all six position sensors monitoring movement of flat faces of the disc portion or associated with the disc portion spaced from the central axis by the same radial distance which may for example be from 10 to 20 cms.

The position sensors may be optical sensors which are capable of sensing to an accuracy of 1 part in 100,000. Because of the orientation of the three pairs of sensors, the equipment can sense torsional twisting of the hollow torsion bar as well as net vertical and net lateral movement of the distal end of the torsion, bar, being the end with which the sensors are associated.

In use, if a torque load is applied to the hollow torsion bar, very slight rotary flexure of the torsion bar is invariably likely to be produced and is detected by the two or more pairs of position sensors. A comparison of the measurements of the position sensors of each pair will indicate whether there is vertical or lateral movement of the hollow torsion bar under an applied side load, as well as rotary twisting of the arm under the applied torque load. Preferably the calibration unit is associated with a computer which is capable of processing the different position sensor readings from each applied torque, to provide a final torque measurement output figure alongside figures representing side loads in the vertical and horizontal planes. The signal processing is described in greater detail below in conjunction with the illustrated embodiment which is given by way of example.

The calibration unit of the invention is not an absolute measurement of torque in the same way as a long arm beam is. It must itself be calibrated, but since it is capable of torque measurements to an accuracy several orders of magnitude higher than that of the long arm beam which is the primary conventional calibration unit, and since it is capable of retention of its calibrated accuracy over long periods of use, the unit is perfectly acceptable as a secondary calibration unit. Preferably the unit is designed as a portable unit contained in a housing which has a constant temperature and humidity.

For calibration purposes, the unit of the invention is provided with a mounting frame which has two mutually perpendicular support surfaces, and a levelling means to enable the unit to be positioned on a flat surface with one of those support surfaces precisely horizontal. The unit is calibrated at a certified testing site where the acceleration due to gravity, g, is accurately known. After levelling, a scale pan is attached to the end of the torsion bar, and proof masses added to the scale pan to apply a precisely known torque and side load to the bar. The measured torque and side load from the unit can be compared with that applied, and the measurements repeated for a statistically meaningful number of measurements with the same or different applied torques and/or side loads. Then the unit is rotated through 90° until it is positioned on the same flat surface but resting on its other support surface. The measurements of applied torque are repeated, but because of the rotation of the unit the side load element of the first series of measurements are absent, as far as that pair of sensors is concerned in the final calibration. Thereafter the unit, without the scale pan and proof masses, can be carried to any factory site and used to calibrate torque sensing tools, since the deflection of the torsion bar due to applied torque is not dependent on the acceleration due to gravity, g, at the factory site.

DETAILED DESCRIPTION OF THE PREFERRED INVENTION

Figure 1:
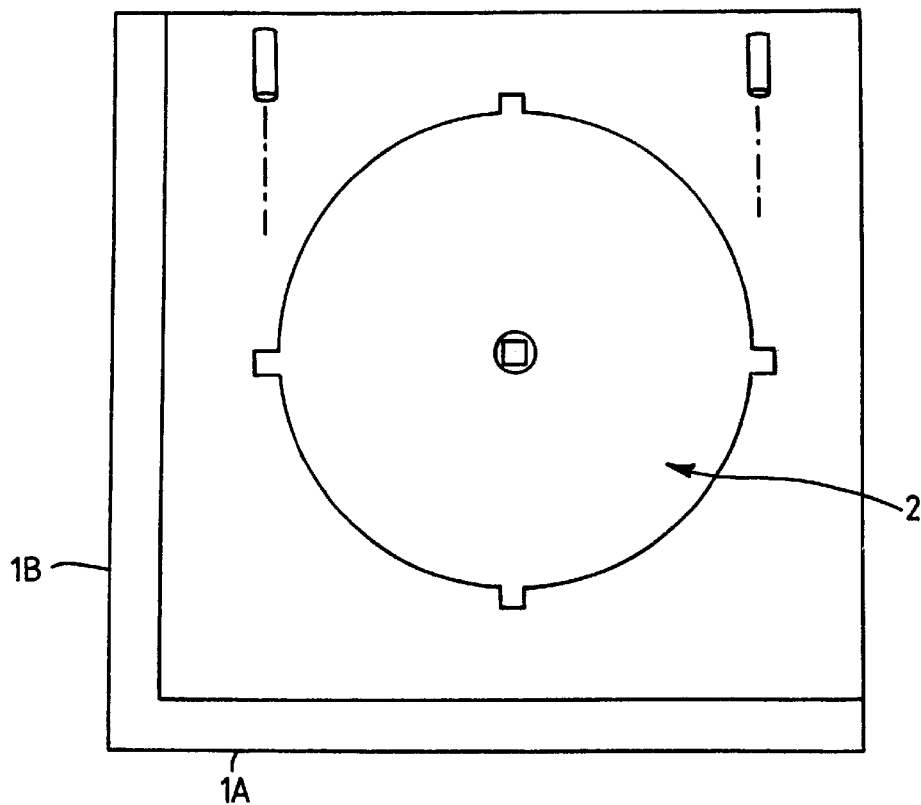
FIG. 1 represents schematically a front view of a calibration unit according to this invention.
Figure 2:
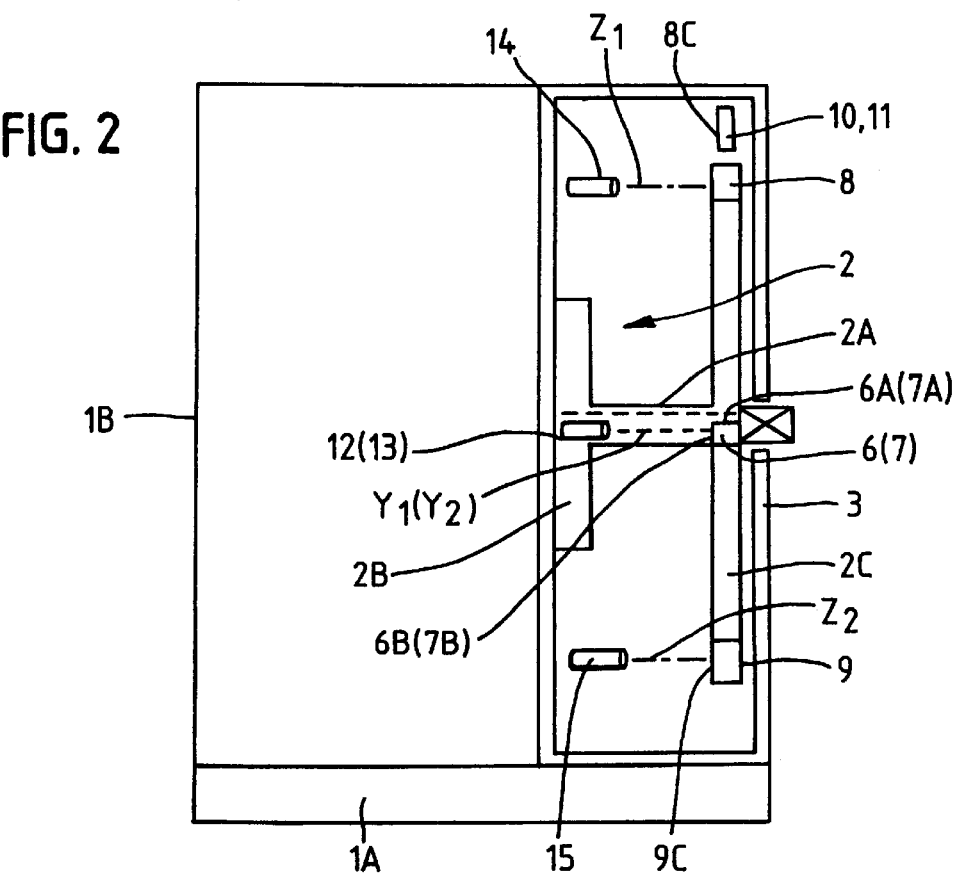
FIG. 2 is a side view of the calibration unit.

Referring first to FIGS. 1 and 2, the unit comprises a solid mounting frame 1 on which is mounted in cantilever a hollow torsion bar 2 that is machined from a single piece of stainless steel as a hollow torsion rod 2a having a mounting flange 2b at one end and a sensor reference flange 2c at the other end. The sensor reference flange 2c also includes, at its centre, a square drive drive 2d for the application of torque to the torsion bar 2. The mounting frame 1 has two mutually perpendicular support surfaces 1a and 1b, and a levelling means (not shown) to permit accurate levelling to bring one of those surfaces, 1a, precisely into the horizontal plane. The unit is designed for table-top mounting.

The torsion bar 2 is enclosed in a housing 3 which is climate-controlled. That is to say, both the temperature and the relative humidity of the air within the housing are controlled so as to be stable within defined limits. Only the drive 2d of the torsion bar 2 is accessible from outside the housing 3. Means (not shown) are provided for maintaining the air within the housing 3 at a slightly superatmospheric pressure so that there is a regular air leakage out of the housing through the gap through which the drive 2d extends.

Figure 3:
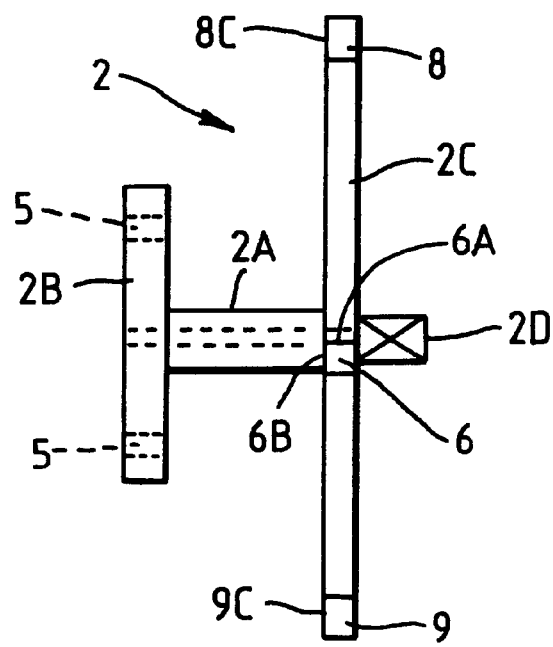
FIG. 3 is a side view of the hollow torsion bar of the unit.
Figure 4:
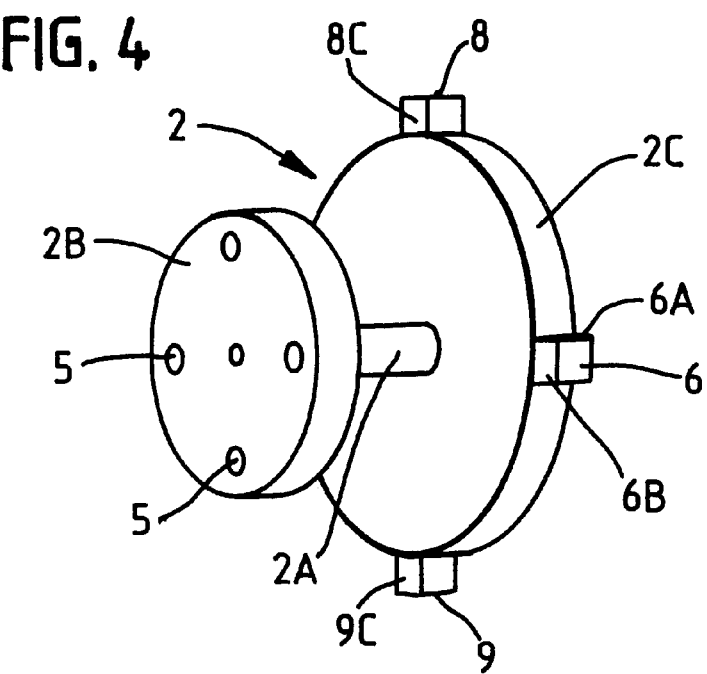
FIG. 4 is a perspective view of the hollow torsion bar.
Figure 5:
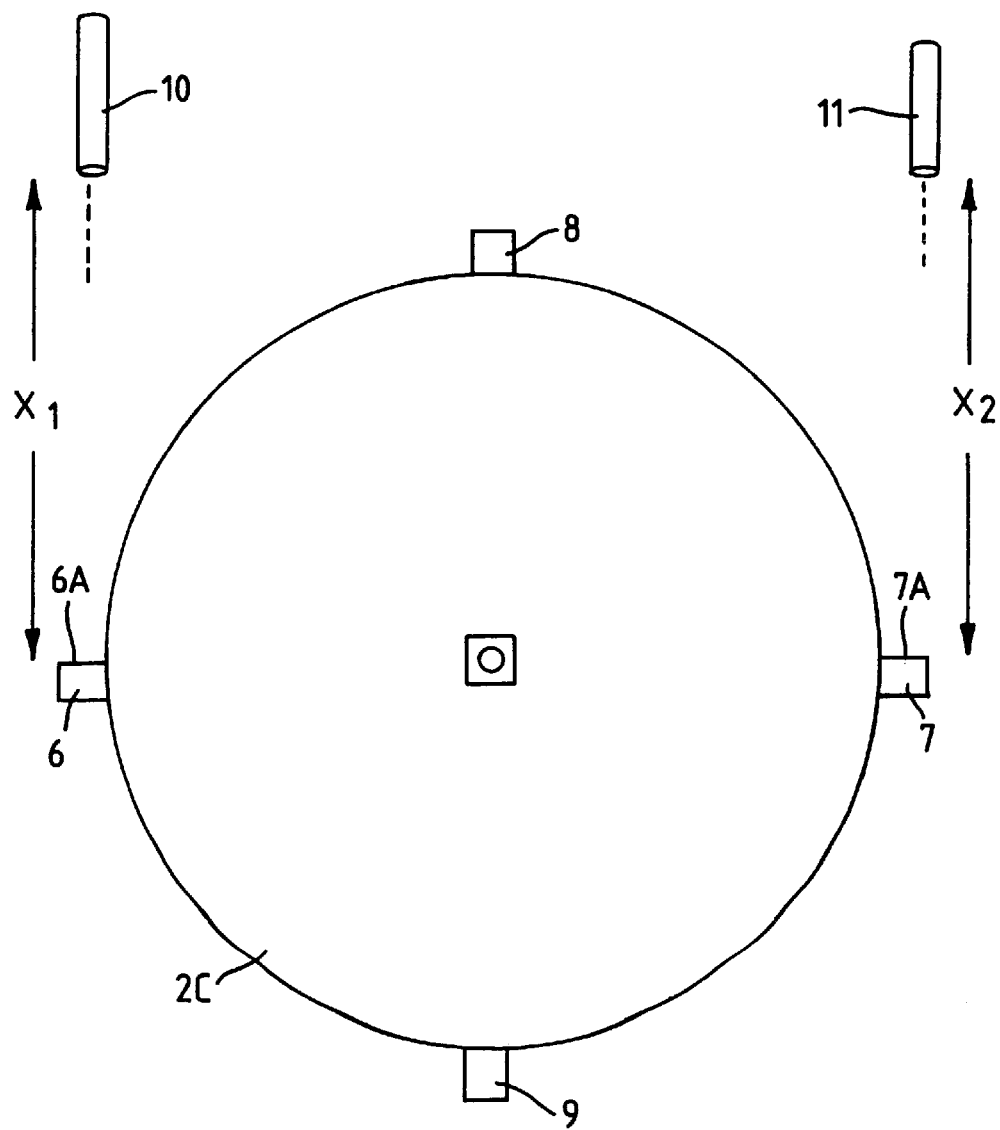
FIG. 5 is a front elevation of the hollow torsion bar showing its disposition relative to the four optical position sensors of the unit.

The torsion bar 2 is more clearly shown in FIGS. 3 to 5. The mounting flange 2b has an array of mounting holes 5 for mounting the torsion bar 2 securely to the frame 1. The sensor reference flange 2c is provided with four radially projecting lugs 6, 7, 8 and 9 which together provide three pairs of diametrically opposed measurement faces facing in mutually perpendicular directions. One pair of measurement faces 6a and 7a is coplanar and horizontal when there is no torque applied to the torsion bar 2 and when the base plate 1a is level. A second pair of measurement faces 6b and 7b is coplanar and vertical. The third pair of measurement faces 8c and 9c is also coplanar and vertical. All six measurement faces are the same radial distance from the central axis of the torsion bar 2.

The torsion bar 2 can be machined with great accuracy from a single piece of steel on a metal turning lathe. It is important to maintain the accuracy of machining as high as possible, as such standards of accuracy will be reflected in the accuracy of measurement attainable in the completed unit. The faces 6, 7, 8 and 9 should also be machined with great accuracy to obtain three pairs of mutually perpendicular faces, the faces of each pair being accurately coplanar with one another and those of the first pair 6a and 7a with a central axis of the torsion bar 2.

An optical sensor 10, 11, 12, 13, 14 or 15 is associated with each respective one of the faces, 6a, 7a, 6b, 7b, 8c and 9c. The sensors 10, 11, 12, 13, 14 and 15 are mounted on the support frame 1 within the housing 3, and are aligned so as to be perpendicular to their associated faces. All six measure movement at the same radial distance D from the central axis or the torsion bar 2.

As illustrated, the optical sensors are mounted spaced from their associated faces but aiming towards those faces. That would be a mounting arrangement suitable for non-contacting laser sensors which give a highly accurate read-out using interferometry. Alternatively, the sensors could be digital contacting linear displacement transducers such as those manufactured and marketed by Heidenhain. Such transducers incorporate a linearly movable probe which contacts the associated face of the sensor reference flange 2c, and optical fringe techniques are used to provide an accurate measurement of movement of that probe.

Suppose the sensors 10 and 11 measure the distances $x_1$ and $x_2$ (FIG. 5) between the sensors and their associated faces 6a and 7a; the sensors 12 and 13 measure the corresponding distances $y_1$, and $y_2$ (FIG. 2) between the sensors and their associated faces 6b and 7b; and the sensors 14 and 15 measure the corresponding distances $z_1$, and $z_2$ (FIG. 2). Absolute values of $x_1$, $x_2$, $y_1$, $y_2$, $z_1$ and $z_2$ are unimportant, as it is only the changes $\delta x_1$, $\delta x_2$, $\delta y_1$, $\delta y_2$, $\delta z_1$, and $\delta z_2$ which are used in the calculation of torque and side loading.

If a torque were applied to the torsion bar 2 with zero side load, then $\delta x_1$ and $\delta x_2$ would be equal and opposite, and $\delta y_1$, $\delta y_2$, $\delta z_1$, and $\delta z_2$ would be zero. Ideally:

$$\delta x_1 = -\delta x_2$$

$$\delta y_1 = \delta y_2 = \delta z_1 = \delta z_2 = 0$$

Therefore a single averaged reading of angular deviation of the shaft 2a can be derived as:

$$\frac{\delta x_1 - \delta x_2}{2D}$$

If there is a vertical side load on the shaft 2, then the changes in the measured distances $x_1$ and $x_2$ or in the measured distances $z_1$, and $z_2$ will reflect the deviation of the shaft 2 due to those side loads. The side load deviation in the vertical plane will be $$\frac{\delta x_1 + \delta x_2}{2D} = \frac{\delta z_1 + \delta z_2}{2D}$$

Similarly if there is a horizontal side load the side load deviation will be:

$$\frac{\delta y_1 + \delta y_2}{2D}$$

The readings from the six optical sensors are passed to a computer, which may be an integral part of the unit or a suitably programmed external computer capable of accepting analog or digital outputs from the sensors. If the distance D is known, the angular deflection of the arm 2 corrected for side loads in the horizontal and vertical planes can be calculated, and the results of that calculation along with actual values of deflection due to side loads displayed on a screen or stored in memory.

Calibration of the unit is carried out at a certified test site where the acceleration due to gravity, g, is known and accurate proof masses are available. The unit is first secured to a level stable work surface, resting on its support faces 1a and adjusted until the faces 6a, 7a lie precisely in the horizontal plane. A rigid calibration beam (not illustrated) is then keyed to the drive 2d. The calibration beam is a horizontal beam carrying a scale pan at each of its opposite ends. Initially the calibration beam is balanced by adding lightweight proof masses to one scale pan or the other until the angular deflection of the torsion bar 2 is zero. The side load deviation of the torsion bar 2 in the vertical plane can be measured and stored in memory. That in the horizontal plane is zero, by virtue of the careful levelling initially.

Next, a known proof mass is added to one scale pan, and the angular deflection of the torsion bar 2 measured. That can be repeated for a range of proof masses, and the results of side load on the deflection of the shaft can be plotted and stored by adding identical proof masses to the opposite scale pans. In the computer memory there is thus built up a bit map of angular deflection versus applied torque, wherein torque is measured independently of side loads.

The proof masses for the above calibration would be reference proof masses certified for accuracy. The distance from the scale pans to the fulcrum of the calibration beam would be accurately known. The applied torque is therefore directly measured as M×D×g, where M is the proof mass, D the known distance from the scale pans to the fulcrum and g the gravitational constant.

The unit is then moved through 90° until it is supported on its other support face 1b, and the process repeated. That provides in computer memory a complete bit map of the effect of side loads in the horizontal and vertical planes as well as an accurately calibrated correlation between torque and angular deflection of the torque bar 2.

After initial calibration, the rigid calibration beam is removed from the drive 2d and the unit can be carried to a factory or other place of use, where the drive head of for example a torque wrench to be calibrated is keyed to the socket. When torque is applied by the wrench, a torque sensor on the wrench indicates the applied torque as sensed by the wrench. That is compared with the applied torque sensed by the unit of the invention, preferably automatically in memory by feeding the sensor output of the torque wrench directly into the computer. The torque application pattern can be made to conform to any recommended standard, such as increasing in 10% increments from 10 of the maximum rated torque of the torque wrench to full rated torque, and repeating each torque measurement a number of times with a return to zero torque between successive measurements. Such conformity to standard recommended patterns of torque application is readily achieved because the unit responds instantly to applied torque, with no significant time being needed for the optical sensors 10 to 15 to settle down before delivering a stable output.

The potential accuracy of the unit of the invention is several orders of magnitude greater than that of the rigid calibration beam and proof masses from which it is itself calibrated, and once calibrated the unit maintains its accuracy for long periods of constant or intermittent use. It can be made as a portable unit without loss of accuracy. Thus even though it provides only secondary calibration as opposed to the direct calibration of a rigid beam, it is more than adequate to satisfy even the most stringent calibration standards for industrial torque sensor calibration units. Moreover, it is the only calibration unit which is capable of measuring side loads, and can distinguish between side loads in two mutually perpendicular places.

What is claimed is:

1. A torque sensing calibration unit for measuring static torque loads comprising:
    a hollow torsion bar having a central axis;
    a first end anchored against rotation;
    a second end provided with a head through which a torque load is applied to the said torsion bar; and
    two or more pairs of position sensors, each pair being arranged to measure movement of the said torsion bar on diametrically opposite sides of the said central axis, the pairs of position sensors being arranged to measure movement of the torsion bar in mutually perpendicular directions.

2. A torque sensing calibration unit according to claim 1, wherein the hollow torsion bar has a disc-shaped second end and a first one of the two or more pairs of sensors is arranged to detect rotary movement about the central axis of the torsion bar.

3. A torque sensing calibration unit according to claim 2, wherein the hollow torsion bar and the disc-shaped second end are machined from a single piece of high quality stainless steel.

4. A torque sensing calibration unit according to claim 2 or claim 3, wherein the first pair of position sensors monitor the positions of a pair of flat coplanar faces of side lugs of the disc-shaped terminal end, a plane of the flat faces of the side lugs being coincident with the central axis of the torsion bar, and wherein an output signals signal from each one of the first pair of position sensors is processed to provide independent measurements of angular movement of the disc-shaped terminal end due to applied torque and lateral movement due to applied side loads.

5. A torque sensing calibration unit according to claim 4, wherein the lugs are equidistant from the central axis.

6. A torque sensing calibration unit according to claim 2, wherein a second pair of the position sensors is arranged to detect movement about an axis transverse to the central axis of the torsion bar, by monitoring the positions of a pair of target zones on a face of the disc-shaped second end of the torsion bar or on the side lugs, on diametrically opposite sides of the central axis.

7. A torque sensing calibration unit according to claim 6, wherein a third pair of the position sensors is arranged similarly to the second pair, but in a mutually perpendicular plane.

8. A torque sensing calibration unit according to claim 2, wherein a second pair of the position sensors is arranged to monitor the positions of a pair of flat coplanar faces of a second pair of side lugs of the disc-shaped second end, the plane of the flat faces of the second pair of side lugs being coincident with the central axis of the torsion bar and perpendicular to the plane of the flat faces of the pair side lugs associated with the first pair of positions sensors, and output signals from the second pair of position sensors are processed to provide independent measurements of angular movement of the disc-shaped second end due to applied torque and lateral movement due to applied side loads.

9. A torque sensing calibration unit to claim 6 or 7, wherein all of the position sensors monitor movement of areas of the second end of the torsion bar at equal distance from the central axis.

10. A torque sensing calibration unit for measuring static torque comprising:
    a torsion bar having a central axis, the torsion bar having a first end anchored against rotation and a free end, the free end having a fitting arranged to receive a torque load;
    the free end of the torsion bar including a reference surface, the reference surface including a first and second pair of faces, the first pair of faces disposed on diametrically opposite sides relative to the longitudinal axis of the torsion bar, the second pair of faces disposed on diametrically opposite sides relative to the longitudinal axis of the torsion bar;
    a first pair of optical position sensors, the first pair of optical position sensors operatively associated with the first pair of faces and arranged to detect rotational displacement of the reference flange about the longitudinal axis of the torsion bar; and
    a second pair of optical position sensors, the second pair of optical position sensors operatively associated with the second pair of faces and arranged to detect displacement of the reference flange in a direction parallel to the longitudinal axis of the torsion bar.

11. The calibration unit of claim 10, wherein a plane of the first pair of faces is parallel to and intersects the longitudinal axis of the torsion bar, and wherein a plane of the second pair of faces is perpendicular to and intersects the longitudinal axis of the torsion bar.

12. The calibration unit of claim 10, wherein a plane of the first pair of faces is parallel to the longitudinal axis of the torsion bar, and wherein a plane of the second pair of faces is perpendicular to the longitudinal axis of the torsion bar.

13. The calibration unit of claim 10, wherein the reference surface comprises a disc oriented perpendicular to the longitudinal axis of the torsion bar, the first pair of faces and the second pair of faces defined by a pair of lugs extending from the disc.

14. The calibration unit of claim 10, wherein the reference surface comprises a disc oriented perpendicular to the longitudinal axis of the torsion bar, the first pair of faces defined by a first pair of spaced apart lugs, the second pair of faces defined by a pair of second spaced apart lugs, each of the lugs extending from the disc.

15. The calibration unit of claim 10, wherein each of the first pair of faces and the second pair of faces are disposed an equal distance away from the central axis of the torsion bar.

16. A torque sensing calibration unit for measuring static torque comprising:
    a torsion bar having a central axis, the torsion bar having a first end adapted for rigid mounting to a fixed frame, the torsion bar further having a free end, the free end having a fitting arranged to receive a torque load;

the free end of the torsion bar including a first pair of reference faces and a second pair of reference faces, the first pair of reference faces disposed on diametrically opposite sides relative to the longitudinal axis of the torsion bar, the second pair of reference faces disposed on diametrically opposite sides relative to the longitudinal axis of the torsion bar;

a first pair of position sensors, the first pair of position sensors positioned to detect displacement of the first pair of reference faces in a direction perpendicular to the longitudinal axis of the torsion bar; and a second pair of position sensors, the second pair of position sensors positioned to detect displacement of the second pair of reference faces in a direction parallel to the longitudinal axis of the torsion bar.

17. The calibration unit of claim 16, wherein the first and second pair of positions sensors comprise optical position sensors.

18. The calibration unit of claim 16, wherein the free end of the torsion bar includes a third pair of reference faces, the third pair of reference faces disposed on diametrically opposite sides relative to the longitudinal axis of the torsion bar and orthogonal relative to the second pair of reference faces, and further including a third pair of position sensors, the third pair of position sensors positioned to detect displacement of the third pair of reference faces in a direction parallel to the longitudinal axis of the torsion bar.

19. The calibration unit of claim 18, wherein the third pair of position sensors comprise optical position sensors, and wherein free end of the torsion bar includes a disc, each of the first, second and third pair of reference faces carried by the disc.

20. A torque sensing calibration unit for measuring static torque comprising:

a torsion bar having a central axis, the torsion bar having a first end adapted for rigid mounting to a fixed frame, the torsion bar further having a free end, the free end having a fitting arranged to receive a torque load;

the free end of the torsion bar including a reference disc having a first pair of lugs disposed on diametrically opposite sides of the reference disc and a second pair of lugs disposed on diametrically opposite sides of the reference disc, each lug in the first pair of lugs defining a first pair of reference surfaces and a second pair of reference surfaces, each lug in the second pair of lugs defining at least a third reference surface;

a first pair of position sensors, the first pair of position sensors operatively associated with the first pair of lugs and arranged to detect displacement of the first pair of reference surfaces in a direction perpendicular to the longitudinal axis of the torsion bar;

a second pair of position sensors, the second pair of position sensors operatively associated with the first pair of lugs and arranged to detect displacement of the second pair of reference surfaces in a direction parallel to the longitudinal axis of the torsion bar; and a third pair of position sensors, the third pair of position sensors operatively associated with the second pair of lugs and arranged to detect displacement of the third pair of reference surfaces in a direction parallel to the longitudinal axis of the torsion bar.

* * * * *